(12) United States Patent
McDonough et al.

(10) Patent No.: US 7,861,108 B2
(45) Date of Patent: Dec. 28, 2010

(54) RESTORING USER STATES IN DYNAMIC COMPUTING ENVIRONMENTS

(75) Inventors: Timothy N. McDonough, Houston, TX (US); Dennis Baker, Houston, TX (US); Phillip A. Leech, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 550 days.

(21) Appl. No.: 11/588,976

(22) Filed: Oct. 27, 2006

(65) Prior Publication Data

US 2008/0155308 A1 Jun. 26, 2008

(51) Int. Cl.
*G06F 11/00* (2006.01)
(52) U.S. Cl. ............................... 714/4; 718/1
(58) Field of Classification Search .............. 714/4; 718/1
See application file for complete search history.

(56) References Cited

U.S. PATENT DOCUMENTS

| | | | | |
|---|---|---|---|---|
| 6,104,717 | A * | 8/2000 | Coile et al. | 370/401 |
| 6,317,775 | B1 * | 11/2001 | Coile et al. | 709/201 |
| 6,473,802 | B2 * | 10/2002 | Masters | 709/229 |
| 6,560,717 | B1 * | 5/2003 | Scott et al. | 714/4 |
| 6,578,068 | B1 * | 6/2003 | Bowman-Amuah | 709/203 |
| 6,871,347 | B2 * | 3/2005 | Hay | 718/105 |
| 7,197,547 | B1 * | 3/2007 | Miller et al. | 709/223 |
| 7,437,594 | B1 * | 10/2008 | Mount et al. | 714/4 |
| 2002/0156613 | A1 * | 10/2002 | Geng et al. | 703/23 |
| 2003/0037108 | A1 * | 2/2003 | Peiffer et al. | 709/203 |
| 2004/0024880 | A1 * | 2/2004 | Elving et al. | 709/227 |
| 2005/0262381 | A1 * | 11/2005 | Ishida | 714/4 |
| 2006/0233106 | A1 * | 10/2006 | Achlioptas et al. | 370/235 |
| 2007/0180449 | A1 * | 8/2007 | Croft et al. | 718/1 |
| 2008/0104607 | A1 * | 5/2008 | Baker | 718/105 |
| 2009/0144515 | A1 * | 6/2009 | Benari | 711/162 |

* cited by examiner

*Primary Examiner*—Philip Guyton

(57) ABSTRACT

In some embodiments, a computer network comprises a computing engine comprising a plurality of compute nodes and a load balancer coupled to the computing engine and coupled to a processor and a memory module, wherein the memory module comprises logic instructions which, when executed by the processor, configure the processor to receive, in the load balancer, a connection request from a first client computing device and a corresponding first persistence identifier for computing services provided by a first compute node managed by the load balancer, restore, on the first compute node, a stored computing session when the first persistence identifier is associated with the stored computing session, initiate, on the first compute node, a generic computing session when the first persistence identifier is not associated with any stored computing session, and assign the connection request from the first client computing device to the first compute node.

20 Claims, 5 Drawing Sheets

| Session ID | Host IP Address | Connecting Server IP Address | Server Pool ID | Compute Node ID | Connection Availability Status |
| --- | --- | --- | --- | --- | --- |
| 000001 | 1.160.55.210 | 1.62.55.5 | 52 | 015 | Unavailable |
| 000010 | 1.136.105.155 | 1.66.224.48 | 64 | 011 | Unavailable |
| 000011 | 155.44.55.151 | 022 | 52 | 022 | Unavailable |
|  |  |  |  | 088 | Available |
|  |  |  |  | 155 | Available |
| 100011 | 22.43.55.257 | 1.82.75.6 | 64 | 325 | Unavailable |

RESTORING USER STATES IN DYNAMIC COMPUTING ENVIRONMENTS

BACKGROUND

Computing networks may be populated with servers and client computers. Servers are generally more powerful computers that provide common functions such as record sharing and Internet access to the client computers. Client computers may be fully functional computers, each having a processor, hard drive, CD ROM drive, floppy drive and system memory.

Recently, thin client computing devices have become more popular among IT organizations. Compared to fully functional client computers, thin clients may have a relatively small amount of system memory and a relatively slow processor. However, thin clients provide several advantages over fully functional client computers. For example, thin clients may be more reliable than fully functional client computers, which in turn reduce maintenance costs.

Thin clients may be connected over a network to a central server. The thin client computer may communicate with the central server via a multi-user terminal server application program. The central server may provide a virtualized operating system for the thin clients connected to it. Additionally, the central server may supply application programs such as, e.g., word processing or Internet browsing to the thin clients. A user's data such as, e.g., document files, spreadsheets and Internet favorites, may be stored on the central server or network storage device coupled to the central server. Thus, when a thin client breaks, it may be easily removed and replaced without the need to restore the user's programs and data such as with a traditional fully functional client computer.

Problems may arise when a user of a thin client connected to a central server through a multi-user terminal server application begins execution of a process that requires a relatively large amount of computing power. For example, if the central server is unable to effectively distribute the computing load required by the process, then other thin client users connected to the same central server through the terminal server application may experience performance problems because a significant portion of the power of the central server is being diverted to process the needs of a single user.

A central server may contain one or more blade computers such as, e.g., the HP BladeSystem product line available from the assignee of the present application, which are ultra-dense, low power blade computers designed to provide a high level of computing power in a relatively small space. In some applications hundreds of blade computers may be mounted in a single rack.

Because blade computers consume less space, power, and produce less heat than conventional rack-mounted computers, they may result in significant cost savings. Additionally, blade computers may be connected in parallel to form computing engines of immense power. An effective way to employ blade computers in a network architecture is desirable

BRIEF DESCRIPTION OF THE DRAWINGS

FIG. 5 is a schematic illustration of some embodiments of a data table.

DETAILED DESCRIPTION

Described herein are exemplary computing environment architectures and methods for restoring user states in dynamic node allocation computing environments. The methods described herein may be embodied as logic instructions on a computer-readable medium. When executed on a processor, the logic instructions cause a computing device to be programmed as a special-purpose machine that implements the described methods. The processor, when configured by the logic instructions to execute the methods recited herein, constitutes structure for performing the described methods.

Figure 1:
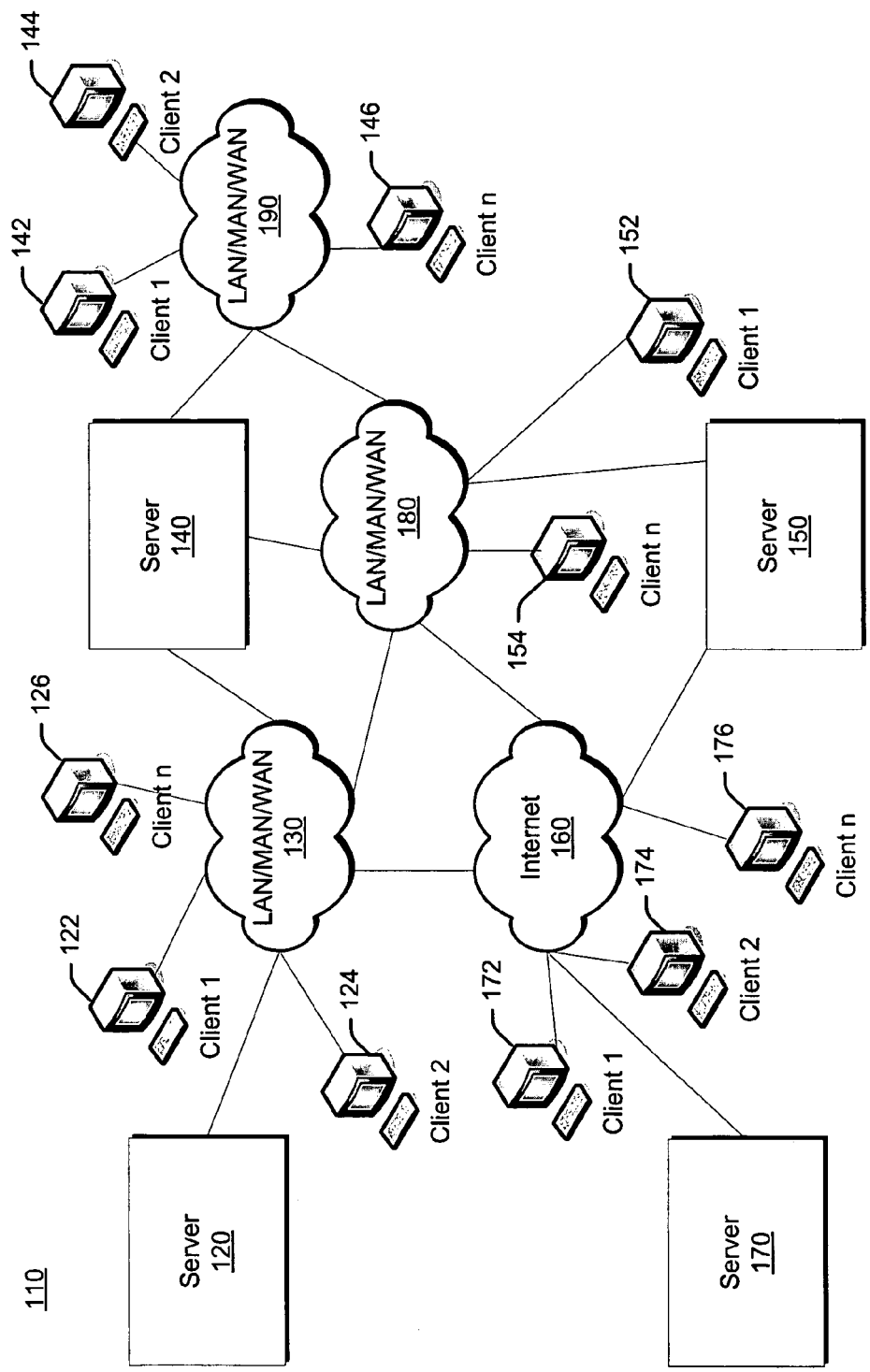
FIG. 1 is a block diagram of a client-server computer network architecture according to an embodiment.

FIG. 1 is a schematic illustration of a block diagram of a computer network 110. The computer network 110 is intended to illustrate a conventional client-server network configuration. A server 120 is connected to a plurality of fully functional client computers 122, 124 and 126 via a communication network 130 such as a Local Area Network (LAN), Metropolitan Area Network (MAN) or a Wide Area Network (WAN) or the like.

The server 120 may be connected to a plurality (n) client computers. Each client computer in the network 110 may be implemented as a fully functional client computer or as a thin client. The magnitude of n may be related to the computing power of the server 120. If the server 120 has a high degree of computing power (for example, fast processor(s) and/or a large amount of system memory) relative to other servers on the network, it will be able to effectively serve a relatively large number of client computers.

The server 120 is connected via a network infrastructure 130, which may comprise any combination of hubs, switches, routers and the like. While the network infrastructure 130 is illustrated as being either a LAN, WAN, or MAN, those skilled in the art will appreciate that the network infrastructure 130 may assume other forms such as, e.g., the Internet or any other intranet. The network 110 may include other servers and clients, which may be widely dispersed geographically with respect to the server 120 and to each other to support fully functional client computers in other locations.

The network infrastructure 130 connects the server 120 to server 140, which is representative of any other server in the network environment of server 120. The server 140 may be connected to a plurality of client computers 142, 144 and 146 over network 190. The server 140 is additionally connected to server 150 via network 180, which is in turn is connected to client computers 152 and 154 over network 180. The number of client computers connected to the servers 140 and 150 is dependent on the computing power of the servers 140 and 150, respectively.

The server 140 is additionally connected to the Internet 160 over network 130 or network 180, which is in turn, is connected to server 170. Server 170 is connected to a plurality of client computers 172, 174 and 176 over Internet 160. As with the other servers shown in FIG. 1, server 170 may be connected to as many client computers as its computing power will allow.

Those of ordinary skill in the art will appreciate that servers 120, 140 150 and 170 need not be centrally located. Servers 120, 140, 150 and 170 may be physically remote from one another and maintained separately. Many of the client computers connected with the network 110 have their own CD-ROM and floppy drives, which may be used to load additional software. The software stored on the fully functional client computers in the network 110 may be subject to damage or misconfiguration by users. Additionally, the software loaded by users of the client computers may require periodic maintenance or upgrades.

Figure 2:
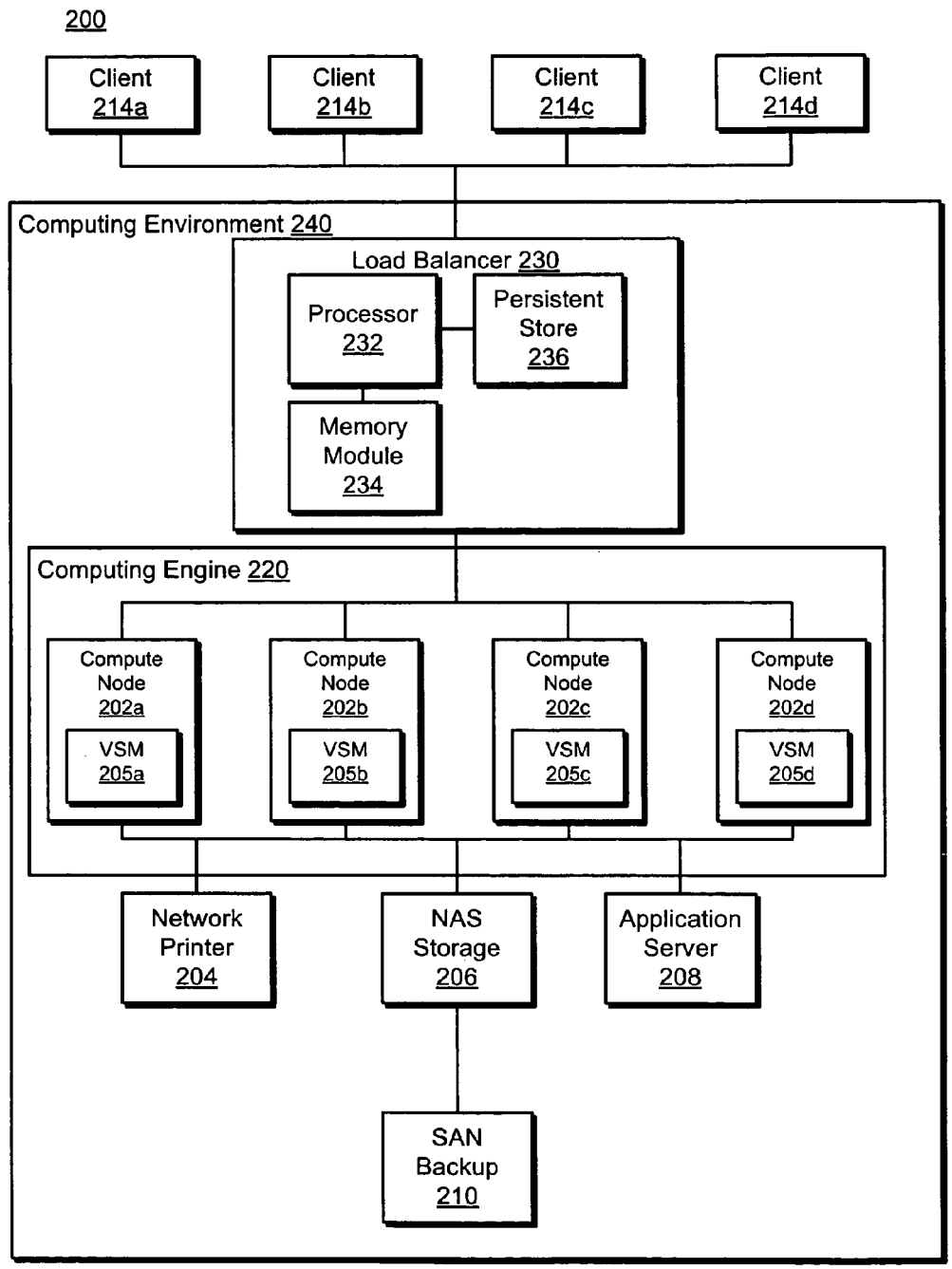
FIG. 2 is a block diagram of an example of a network architecture according to an embodiment.

FIG. 2 is a block diagram of an example of a computer network architecture. The network architecture is referred to generally by the reference numeral 200. In some embodiments, a plurality of client computing devices 214a-214d are coupled to a computing environment 240 by a suitable communication network.

Within computing environment 240 a plurality of compute nodes 202a-202d are coupled to form a central computing engine 220. Compute nodes 202a-202d may be referred to collectively by the reference numeral 202. Each compute node 202a-202d may comprise a blade computing device such as, e.g., an HP bc1500 blade PC commercially available from Hewlett Packard Corporation of Palo Alto, Calif., USA. Four compute nodes 202a-202d are shown in the computing environment 240 for purposes of illustration, but compute nodes may be added to or removed from the computing engine as needed. The compute nodes 202 are connected by a network infrastructure so that they may share information with other networked resources and with a client in a client-server (or a terminal-server) arrangement. The compute nodes 202a-202d each comprise a virtual session manager 205a-205d, respectively. Operations implemented by VSMs 205a-205d are described below.

The compute nodes 202 may be connected to additional computing resources such as a network printer 204, a network attached storage device 206 and/or an application server 208. The network attached storage device 206 may be connected to an auxiliary storage device or storage attached network such as a server attached network back-up device 210.

The compute nodes 202 are additionally connected to a load balancer 230. In some embodiments, the load balancer 230 may be implemented as a BIG-IP Blade Controller, commercially available from F5 Networks of Seattle, Wash., USA.

In some embodiments, load balancer 230 comprises a processor 232, a memory module 234, and a persistent memory store 236. The processor 232 may further comprise random access memory (RAM) and/or read only memory (ROM), or other kinds of volatile or non-volatile memory, or some combination thereof. The persistent memory store 236 may be implemented as magnetic storage such as a hard disk drive, optical storage such as a CD-ROM or a DVD-ROM, or some combination of these and other persistent memory devices.

In the embodiment depicted in FIG. 2, the load balancer 230 may be a network traffic load balancer configured to direct (i.e., allocate) certain types of network traffic to the plurality of compute nodes 202. The load balancer 230 may be connected to a plurality of client computers 214 and may be adapted to receive network traffic, including requests to perform computing services then logically track and dynamically direct these connections to one or more compute nodes.

The load balancer 230 may distribute (allocate) requests for computing services among the compute nodes 202 according to any protocol or algorithm. A use-based distribution algorithm is one example of a distribution scheme that may be used by the load balancer 230 to distribute requests for computing services to the compute nodes 202. In a use-based distribution scheme, the load balancer 230 may have the capability to communicate with the compute nodes 202 to determine the relative workload being performed by each of the compute nodes 202. Requests for additional work may be forwarded to a compute node that is under-utilized compared to other compute nodes.

The client computers 214 may comprise thin client computer systems. The load balancer 230 may be coupled to the client computers through a single-user terminal server program such as the single-user terminal server utility that is provided as part of the Microsoft Windows XP operating system, which is available from Microsoft Corporation of Redmond, Wash.

In some embodiments, the computing environment 240 may be adapted to reserve a compute node for a session connection between a client computing device and a compute node in the computing engine 220. By way of example, a client computing device 214a may initiate a connection request for services from one or more of the compute nodes 202. The connection request is received at the load balancer 230, which selects a first compute node, e.g., 202a to which the connection request may be directed. In the event that the connection between client 214a and compute node 202a is disrupted due to, e.g., a network failure, or device failure, the load balancer 230 may reserve the session connection with the compute node 202a for a predetermined period of time to permit the user of client computing device 214a to reestablish the connection. The session may be reestablished from the same client 214a or from a different client such as, e.g., one of other client computing devices 214b-214d.

The structure and operations of computing environment 240 address this issue. In some embodiments, the memory module 234 of load balancer 230 includes logic instructions which, when executed by processor 232, cause the processor to create and maintain a data record in persistent store 236 or memory module 234. The data record associates a session identifier associated with a connection with an identifier that identifies the compute node to which the connection request is assigned by the allocation engine 230. In the event that a connection is severed, the compute node to which the connection was assigned may be reserved for a period of time. Connection information stored in the data record may be used by the load balancer 230 to reestablish the session in a connection between the persistent user and the corresponding compute node. The client computing device may be the same client or a different client.

Figure 3:
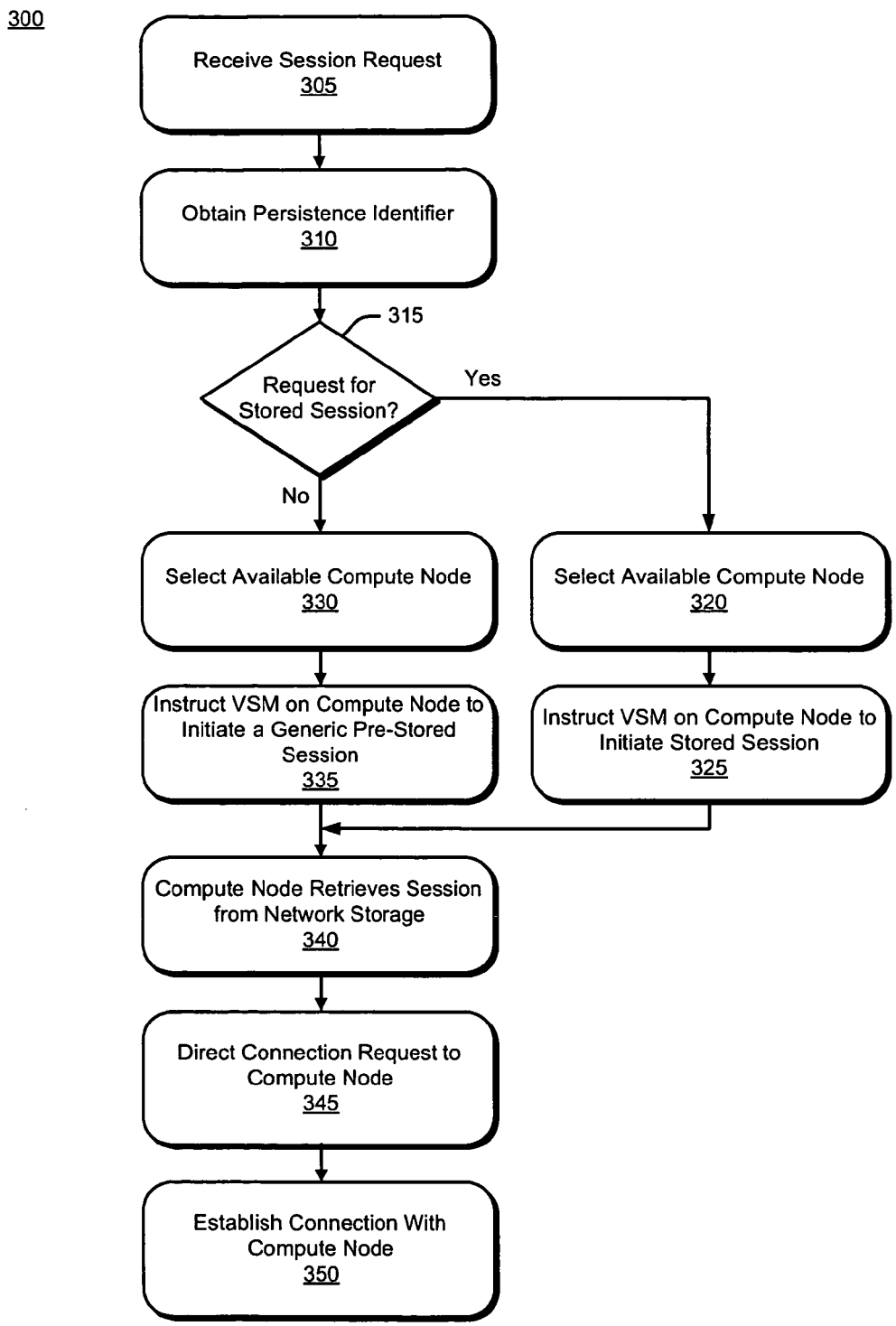
FIG. 3 is a flowchart illustrating operations in an embodiment of a method for implementing user persistence in a dynamic node allocation computing environment.
Figure 4:
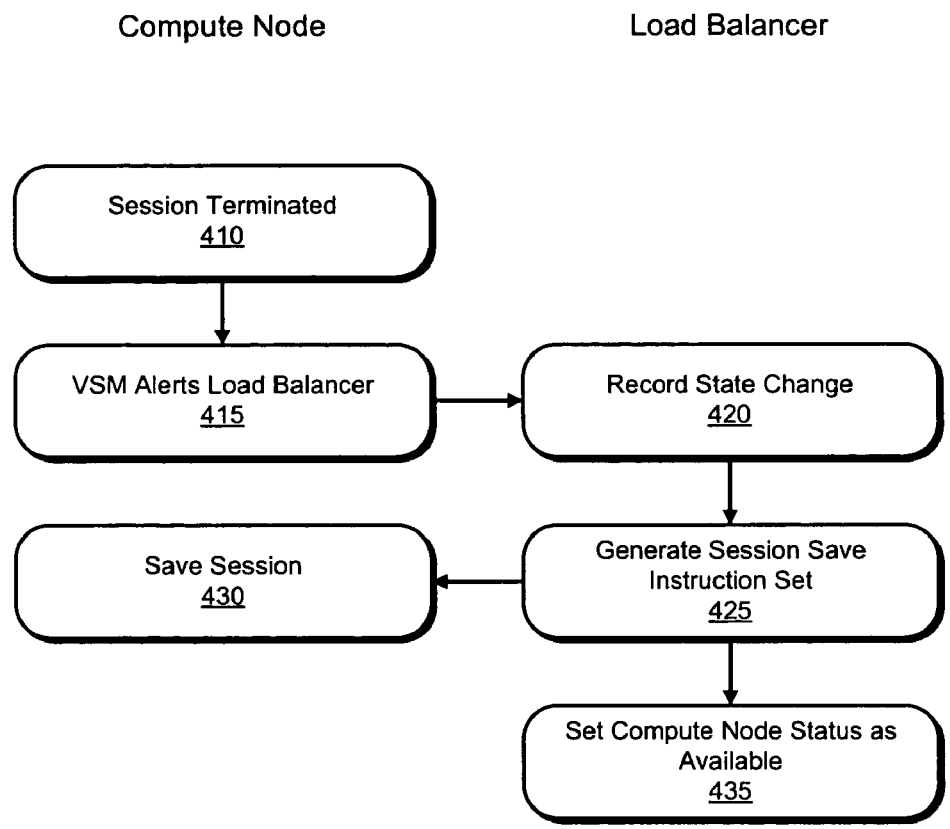
FIG. 4 is a flowchart illustrating operations in an embodiment of a method for terminating a session in an embodiment.

FIGS. 3-4 are flowcharts illustrating operations in a method for restoring user states in a dynamic node allocation computing environment. FIG. 5 is a schematic depiction of some embodiments of a data table. In some embodiments, the operations of FIGS. 3-5 may be implemented by the processor 232 in load balancer 230. Referring to FIGS. 3-5, at operation 305 a session request is received from a client computing device such as one of the thin client computing devices 214. In some embodiments, the session request includes a persistence identifier identifying the computing device which generated the connection request. In some embodiments, the persistence identifier is embodied as a user name identifier which uniquely identifies a user of client 214. In some embodiments, the persistence identifier is embodied as a connection request identifier that uniquely identifies a connection request. A persistence identifier may be embodied as, e.g., a sequential identifier assigned by the allocation engine 230 when a connection request is received 305 or any other identifier unique to user of the client 214.

At operation 310 a persistence identifier is obtained. In some embodiments, the persistence identifier is obtained by, e.g., parsing the identifier from the connection request or by generating a connection identifier in the allocation engine 230. At operation 315 it is determined whether the persistence identifier associated with the session request is associated with session information stored in a memory location such as, e.g., a database or a data table. In some embodiments, this is performed by checking to determine whether there is an entry for the persistence identifier in the data record maintained in the persistent memory store 236 or memory module 234.

Referring to FIG. 5, in some embodiments the data table 500 associates a persistence identifier with a compute node ID that identifies the compute node to which the session is assigned. In some embodiments, the data table 500 may include a column for a persistence identifier, the host IP address of the client, the IP address of the virtual server through which the client connected to the computing environment 240, the pool ID of the computing environment 240, a compute node ID, and a connection availability status. To determine whether there is a stored session that matches the session identifier associated with the persistence identifier, the data table 500 may be searched for a persistence identifier that matches the persistence identifier obtained in operation 310.

If, at operation 315 the persistent identifier is in the data table 500 (i.e., if the session is stored), then control passes to operation 320 and an available compute node is selected for the session request. For example, an available compute node may be selected using the information in the connection availability status column of data table 500. At operation 325 the load balancer 230 instructs the virtual session manager (VSM) of the compute node selected in operation 320 to initiate the stored session identified in the session request. Initiating the stored session may include, for example, retrieving session data and context information from a storage device such as NAS storage device 206 coupled to the compute node.

By contrast, if, at operation 315, the persistence identifier is not in the data table 500, then a control passes to operation 330 and an available compute node is selected for the session request. For example, an available compute node may be selected using the information in the connection availability status column of data table 500. At operation 335 the load balancer 230 instructs the virtual session manager (VSM) of the compute node selected in operation 320 to initiate a generic session for the session request. Initiating a generic session may include, for example, establishing connection information and/or context information for the session. The session information may be stored in a storage location such as, for example, NAS storage 206.

At operation 340 the compute node 202 retrieves the session information for storage such as, for example, NAS storage device 206. At operation 345 the connection request is directed to the compute node 202 to which it was assigned, and at operation 350 a connection is established between the client device that originated the session request and the compute node 202.

In some embodiments, load balancer 230 may further implement logic instructions which, when executed, configure the processor 232 to change the availability status of a compute node to "unavailable" when a session is connected and to "available" when a session is terminated, e.g., due to a connection termination request from a client. Referring to FIG. 4, at operation 410 a session is terminated. In some embodiments the session may be terminated as a result of a session termination request generated by a user of a client computing device 214, or by the device itself, or from a failure in hardware or software. When a session is terminated, at operation 415 the virtual session manager 205 in the compute node 202 alerts the load balancer 230 that the session is terminated. In response to the session termination alert, at operation 420 the load balancer 230 records a state change associated with the compute node 202 responsible for the session. For example, referring to FIG. 5, the connection availability status for the compute node may be changed from "unavailable" to "available."

At operation 425 the load balancer 230 generates a session save instruction set, which is transmitted to the compute node 202 responsible for the session. In response to the instruction set, the virtual session manager 205 of the compute node 202 causes session information to be saved in a storage medium such as, e.g., the NAS storage device 206 coupled to the compute node. At operation 430 the session is saved. At operation 435 the compute node status is set to available.

The session information may be saved for an arbitrary period of time. In some embodiments the time threshold may be implemented as a parameter that may be set, e.g., by a system administrator. In some embodiments the timer can be disabled. The time threshold may be fixed or dynamic. In some embodiments, the session persistence record is deleted when this time threshold expires. This may be completed as a component of session clean up tools used to manage the blade sessions themselves.

Load balancer 230 may further implement logic instructions which, when executed, set the compute node status to "available," thereby permitting the compute node to be used for subsequent session requests.

The operations of FIGS. 3-4 enable the allocation engine 230 to create and maintain a data table 500 (FIG. 5) that persistently tracks session information including the availability status of a compute nodes, and uses the table to enable originating users to re-establish severed sessions.

In the description and claims, the term "coupled" may mean that two or more devices are in direct physical or electrical contact or that two or more devices may not be in direct physical or electrical contact with each other, but yet may still cooperate or interact with each other. For example, two devices may be coupled through a third device.

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. An apparatus comprising:
   a plurality of compute nodes; and
   a load balancer in communication with the plurality of compute nodes and programmed to:
   receive a connection request from a first client computing device and receive a corresponding first persistence identifier for a virtualized operating system instance from the first client computing device, the virtualized operating system instance is to enable the first client computing device to execute application programs on a first one of the compute nodes;
   restore, on the first compute node, a stored virtualized operating system instance when the first persistence identifier is associated with the stored virtualized operating system instance;
   initiate, on the first compute node, a new virtualized operating system instance when the first persistence identifier is not associated with any stored virtualized operating system instance;
   assign the connection request from the first client computing device to the first compute node;

receive a connection disable request from the first compute node, wherein the connection disable request identifies the first compute node; and store a state change associated with the stored virtualized operating system instance.

2. An apparatus as defined in claim 1, wherein the load balancer is to associate the persistence identifier with the first compute node.

3. An apparatus as defined in claim 1, wherein the load balancer is to transmit an instruction set representing the virtualized operating system instance to the first compute node.

4. An apparatus as defined in claim 3, wherein the load balancer is to set the state of the first compute node status as available.

5. An apparatus comprising:

a plurality of compute nodes; and a load balancer in communication with the plurality of compute nodes and programmed to:

receive a connection request from a first client computing device and receive a corresponding first persistence identifier for a virtualized operating system instance from the first client computing device, the virtualized operating system instance is to enable the first client computing device to execute application programs on a first one of the compute nodes;

restore, on the first compute node, a stored virtualized operating system instance when the first persistence identifier is associated with the stored virtualized operating system instance;

initiate, on the first compute node, a new virtualized operating system instance when the first persistence identifier is not associated with any stored virtualized operating system instance;

assign the connection request from the first client computing device to the first compute node;

detect a disabled connection associated with the first compute node; and store a state change associated with the stored virtualized operating system instance.

6. A method comprising:

receiving a connection request from a first client computing device and receiving a corresponding first persistence identifier for a virtualized operating system instance from the first client computing device, the virtualized operating system instance is to enable the first client computing device to execute application programs on a first of a plurality of compute nodes;

restoring, on the first compute node, a stored virtualized operating system instance when the first persistence identifier is associated with the stored virtualized operating system instance;

initiating, on the first compute node, a new virtualized operating system instance when the first persistence identifier is not associated with any stored virtualized operating system instance;

assigning the connection request from the first client computing device to the first compute node;

detecting a disabled connection associated with the first compute node; and storing a state change associated with the stored virtualized operating system instance.

7. The method of claim 6, further comprising associating the persistence identifier with the first compute node.

8. The method of claim 6, further comprising transmitting an instruction set representing the virtualized operating system instance to the first compute node.

9. The method of claim 8, further comprising setting the state of the first compute node status as available.

10. A method comprising:

receiving a connection request from a first client computing device and receiving a corresponding first persistence identifier for a virtualized operating system instance from the first client computing device, the virtualized operating system instance is to enable the first client computing device to execute application programs on a first of a plurality of compute nodes;

restoring, on the first compute node, a stored virtualized operating system instance when the first persistence identifier is associated with the stored virtualized operating system instance;

initiating, on the first compute node, a new virtualized operating system instance when the first persistence identifier is not associated with any stored virtualized operating system instance;

assigning the connection request from the first client computing device to the first compute node;

receiving a connection disable request from the first compute node, wherein the connection disable request identifies the first compute node; and storing a state change associated with the stored virtualized operating system instance.

11. The method of claim 10, further comprising, in response to the connection disable request, saving session information for the first client computing device in the stored virtualized operating system instance.

12. A tangible article of manufacture comprising a computer-readable medium storing machine readable instructions that, when executed, cause a processor to:

receive a connection request from a first client computing device and receive a corresponding first persistence identifier for a virtualized operating system instance from the first client computing device, the virtualized operating system instance is to enable the first client computing device to execute application programs on a first of a plurality of compute nodes;

restore, on the first compute node, a stored virtualized operating system instance when the first persistence identifier is associated with the stored virtualized operating system instance;

initiate, on the first compute node, a new virtualized operating system instance when the first persistence identifier is not associated with any stored virtualized operating system instance;

assign the connection request from the first client computing device to the first compute node;

receive a connection disable request from the first compute node, wherein the connection disable request identifies the first compute node; and store a state change associated with the stored virtualized operating system instance.

13. A tangible article of manufacture as defined in claim 12, wherein the machine readable instructions, when executed, cause the processor to associate in memory the persistence identifier with the first compute node.

14. A tangible article of manufacture as defined in claim 12, wherein the machine readable instructions, when executed, cause the processor to transmit an instruction set representing the virtualized operating system instance to the first compute node.

15. A tangible article of manufacture as defined in claim 14, wherein the machine readable instructions, when executed, cause the processor to set the state of the first compute node status as available.

16. A tangible article of manufacture comprising a computer-readable medium storing machine readable instructions that, when executed, cause a processor to:
receive a connection request from a first client computing device and receive a corresponding first persistence identifier for a virtualized operating system instance from the first client computing device, the virtualized operating system instance is to enable the first client computing device to execute application programs on a first of a plurality of compute nodes;
restore, on the first compute node, a stored virtualized operating system instance when the first persistence identifier is associated with the stored virtualized operating system instance;
initiate, on the first compute node, a new virtualized operating system instance when the first persistence identifier is not associated with any stored virtualized operating system instance;
assign the connection request from the first client computing device to the first compute node;
detect a disabled connection wherein the connection was associated with the first compute node; and
store a state change associated with the stored virtualized operating system instance.

17. An apparatus comprising:
a computer-readable medium to store a virtualized operating system instance, the virtualized operating system instance to enable a first client computing device to execute application programs on a first compute node of a plurality of compute nodes;
a load balancer programmed to:
receive a connection request and a corresponding first persistence identifier for the virtualized operating system instance from the first client computing device;
instruct the first compute node to retrieve the stored virtualized operating system instance from the computer-readable medium when the first persistence identifier is associated with the stored virtualized operating system instance;
initiate, on the first compute node, a new virtualized operating system instance when the first persistence identifier is not associated with any stored virtualized operating system instance;
assign the connection request from the first client computing device to the first compute Node; and
store a state change associated with the stored virtualized operating system when a connection disable request is received from the first compute node, the connection disable request identifying the first compute node.

18. An apparatus as defined in claim 17, wherein the load balancer is to:
detect a disabled connection associated with the first compute node; and
store a state change associated with the stored virtualized operating system instance.

19. An apparatus as defined in claim 17, wherein the load balancer is to transmit an instruction set representing the virtualized operating system instance to the first compute node.

20. An apparatus as defined in claim 17, wherein the load balancer is to set the state of the first compute node status as available.

* * * * *

UNITED STATES PATENT AND TRADEMARK OFFICE
CERTIFICATE OF CORRECTION

| | | |
|---|---|---|
| PATENT NO. | : 7,861,108 B2 | Page 1 of 1 |
| APPLICATION NO. | : 11/588976 | |
| DATED | : December 28, 2010 | |
| INVENTOR(S) | : Timothy N. McDonough et al. | |

It is certified that error appears in the above-identified patent and that said Letters Patent is hereby corrected as shown below:

In column 10, line 15, in Claim 17, delete "Node;" and insert -- node; --, therefor.

Signed and Sealed this
Fourteenth Day of June, 2011

David J. Kappos
*Director of the United States Patent and Trademark Office*